May 17, 1932. T. J. COOLICK 1,858,538
TROUBLE LIGHT FOR AUTOMOBILES
Filed March 22, 1928 2 Sheets-Sheet 1
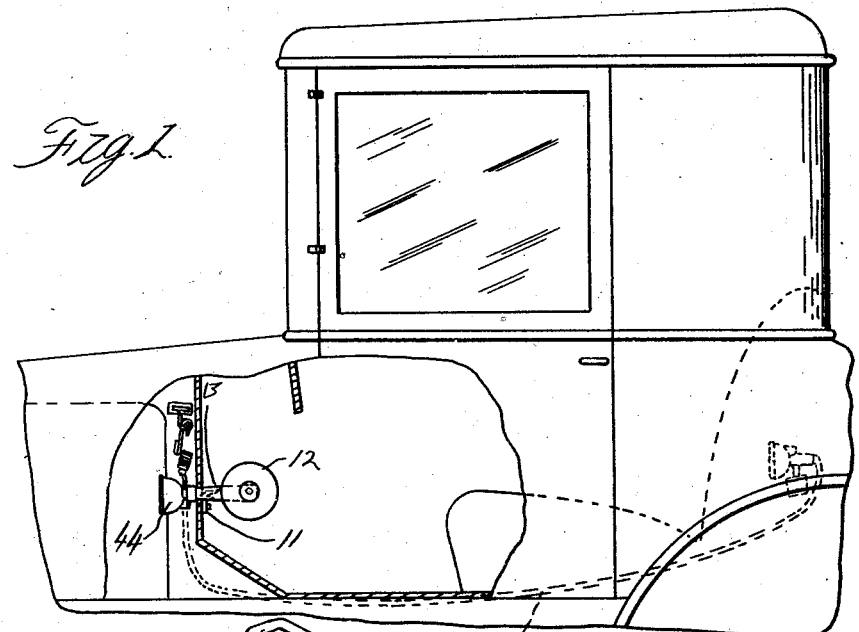
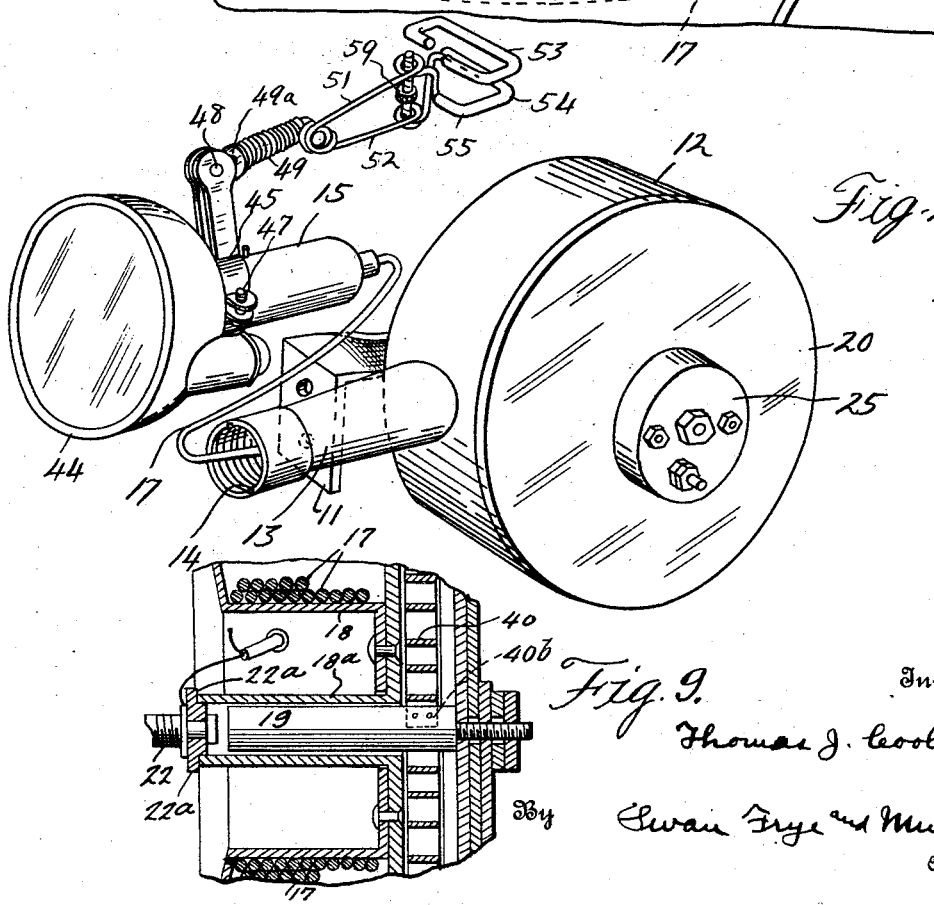
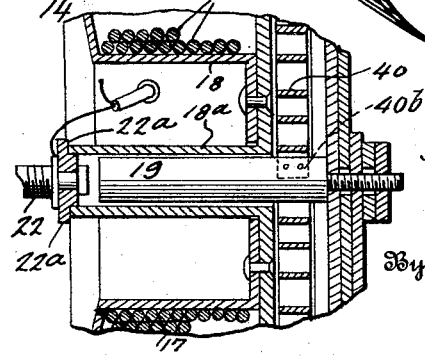
Inventor
Thomas J. Coolick
By Swan Frye and Murray
Attorneys

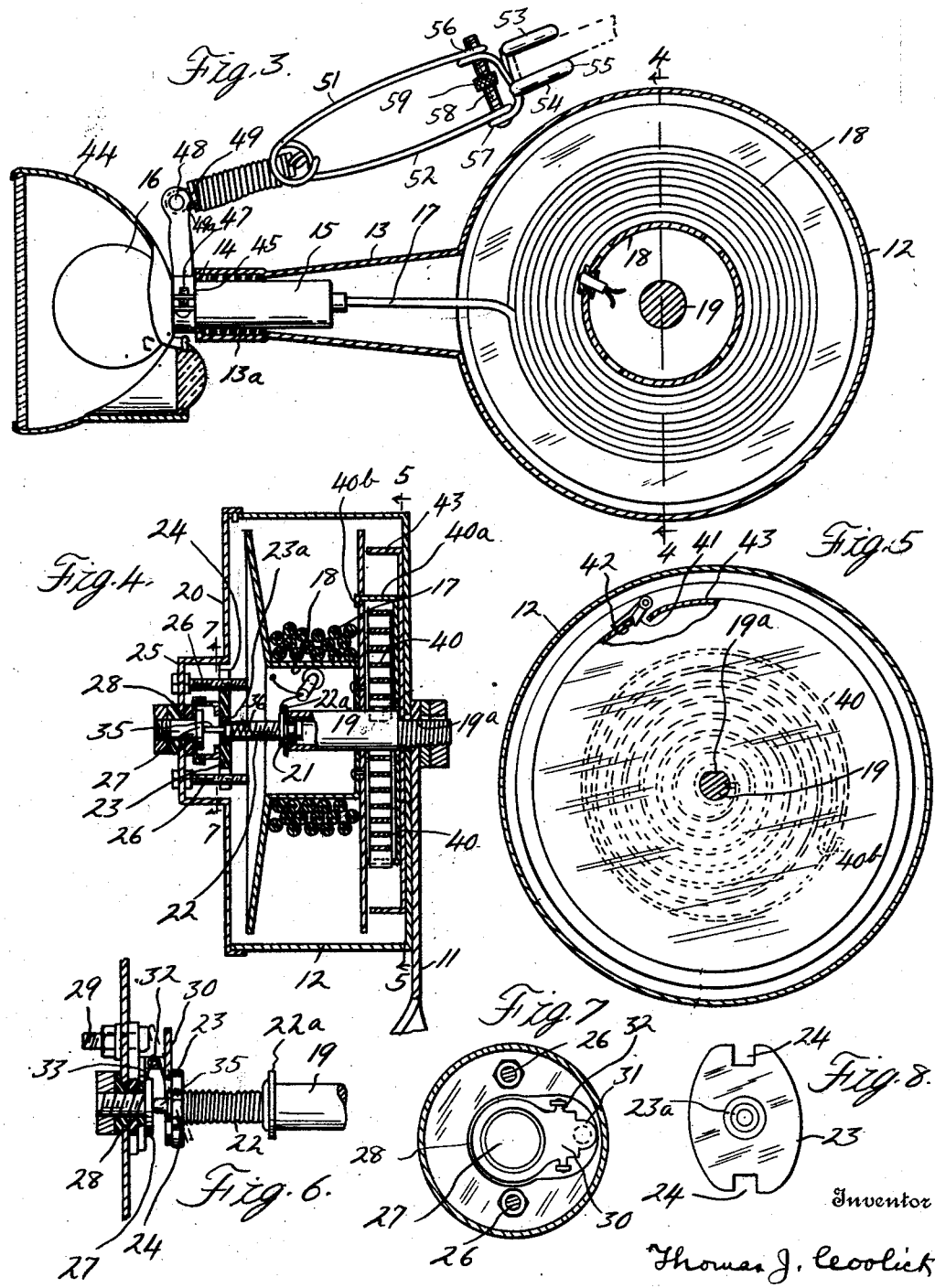

Patented May 17, 1932

1,858,538

UNITED STATES PATENT OFFICE

THOMAS J. COOLICK, OF DETROIT, MICHIGAN

TROUBLE LIGHT FOR AUTOMOBILES

Application filed March 22, 1928. Serial No. 263,723.

This invention relates to trouble lights, and has for its object an improved organization of parts, particularly adapted for use on automobiles, deriving its current from the battery of the car, whereby if tire or engine trouble is encountered during the hours of darkness and away from convenient illumination facilities, investigation may be made and repairs effected within the limitations of the repair-kit tools then at hand, without regard to what particular part of the vehicle is found to be the trouble source. When not in use the device can be stowed away under the engine hood, though easily accessible when needed, and capable of being temporarily hooked into position with a minimum of effort. And while primarily adapted for use thus, my device can with the same facility be mounted upon the dash or windshield to serve as a spot light or indeed as a temporary substitute for one of the headlights, if its bulb has burned out or its circuit connections have become impaired.

In the drawings:

Figure 1 is a fragmentary side elevational view of a motor vehicle, showing the preferred positioning of my device when not in use, as well as a dotted-line suggestion of an emergency positioning thereof.

Figure 2 is a perspective of my improved device.

Figure 3 is a side elevational view, largely in section.

Figure 4 is a sectional elevational view taken along the line 4—4 of Figure 3, and looking in the direction of the arrows there shown.

Figure 5 is an elevational view of the cover piece of the shell, and of the interior rimmed cup piece taken along the line 5—5 of Figure 4 and looking in the direction of the arrows there shown.

Figure 6 is an enlarged detail view of the contact making and breaking parts which are shown in assembly in Figure 4.

Figure 7 is a sectional detail view taken along the line 7—7 of Figure 4 and looking in the direction of the arrows there shown.

Figure 8 is a detail elevational view of the winding detent piece which is carried on the shaft in close though spaced relation to the part illustrated in Figure 6.

Figure 9 is a fragmentary perspective view bringing out the relation of the drum shell with respect to the central shaft elements.

At 12 is shown a shell or housing of circular contour, which may be mounted in any convenient position on the automobile, as for example beneath the engine hood, by means of the bracket 11; from one peripheral edge of the housing 12 projects a neck or tube 13, whose outer end is formed as a socket provided with bayonet slottings 14 or equivalent means, whereby the rearwardly projecting stud or branch 15 of the lamp 16 may be detachably seated therein: Since any unusual vibration of the vehicle would tend to shake loose the bayonet slot connection thus constituted, I provide within the forward end of the neck 13 a compression or helical spring 13a, which encircles the entering end of the lamp stud 15, and, by the pressure lengthwise thereof which it exerts, serves to frictionally hold it against detaching rotative movement within the neck 13. The current cord 17 leads from operative connection with the bulb of the lamp through the stud 15 and through the tube 13 and is wound in suitable length around the drum 18, whose central sleeve 18a is rotatably mounted on the shaft 19 which projects from the closed end of the housing 12, toward its complementary and detachable cover piece 20 which closes its other end; the inner end of the cord 17 is carried through the shell of the drum 18 and extended to connect as at 21, with the shaft extension 22 which projects from the end of the central sleeve 18a of the drum, so as to be exposed at the end of the latter, though insulated from it by the washer or packing 21. This shaft extension 22 is screw-threaded and passes rotatably through the complementarily threaded center portion of the bearing and detent piece 23, which is shown in Figure 8 as preferably elliptical in shape, with terminal notches or cut-away portions 24, and is made of fiber or other non-conducting material; preferably the screw threadings in the center of the fiber detent piece are in the center of an inset metal washer 23a.

The cover piece 20 is preferably turreted or recessed at its center, as indicated at 25, and from diametrically opposite edge portions at the head of this turret or cap extend a pair of pins or studs 26 which engage in the cut-away portions 24 of the detent piece 23 just mentioned. Between these pins 26 is located a contact disc 27, to one side of which is insulatingly positioned, as by the washer 28 which extends under both of these parts and thus insulates each from the turret 25, the binding post stud 29 leading to connection with the battery (not shown), and potentially over one or the other of these latter is positioned a ringlike member 30, from which extends an integral lip piece 31. This is mounted upon the small shaft 32, around which is coiled the spring 33 in such a way as to normally throw the projecting lip piece 31 into engagement with the binding post stud 29. This is the position occupied by the parts when the cord-withdrawing pull upon the drum 18 has rotated it sufficiently to make light rays from the then illuminated bulb available for use, current from the battery passing through the binding post stud 29, the lip piece 31 and the shaft 22 and its connection 21 to the cord. The shaft 22 being a structurally integral part of the central sleeve 18a of the drum, though as heretofore explained insulated therefrom, has its contact plunger 35 in continuous contact with the contact disc 27, thus effecting the necessary ground for the current from the battery. When the rewinding movement of the cord 17 onto the drum takes place, however, the resultant rotative movement of the shaft 22, coupled with the holding of the fiber detent piece 23 against rotation, due to the slidable engagement of the pins or studs 26 in its cut away end portions 24, causes the travel of the detent piece lengthwise of the shaft 22 toward and into engagement with the ring-like member 30, thus at length so swinging it that its projecting lip piece 31 is drawn away from contact with the binding post stud 32, and breaking the circuit. When the cord 17 is again drawn off from the drum 18, the rotative movement of the shaft 22 in the reverse direction from that just described effects the travel of the detent piece 23 in the reverse direction from that just described, that is, toward the drum, thus terminating its pressure upon the ring-like member 30 and allowing its projecting lip to again engage the binding post stud 29.

The cord-withdrawing movement of the drum 18 is yieldingly opposed by a coiled spring 40 of the ordinary curtain-roller type, which engages about the shaft 19 at one end of the drum 18, and is held in desired alignment thereagainst by means of the cap or enclosing plate 40a, which is held to the end of the drum 18 by means of the overbent tongues 40b which pass therethrough. If additional tensioning of the spring 40 is desired, this may be effected by firmly holding the shell 12 and its contained parts and turning the bracket 11 relatively thereto. The projecting end of the flat-sided shaft 19 whereon the similarly squared hole 19a in the end of the bracket 11 engages thus locks them against relative rotative movement. The tensioning thereof begins as soon as the pivoted detent piece 41 carried on one end face of the drum 18 is rotated into engagement with the projecting catch or lip 42 in the cup piece 43, which is carried on the inner face of the fixed end of the drum. When the cord-withdrawing pull ceases, the accumulated tension upon the spring 40 is thus enabled to exhaust itself by a cord indrawing or winding movement of the drum, which draws in the cord until it is all stored on the drum and the stud or branch 15 of the lamp structure can be positioned in the socketed end of the neck 13 and locked in storage position by means of the bayonet slottings 14.

It will be obvious that when an emergency requires it, and dependent upon the length of the cord used, the lamp portion 16 of my device can be withdrawn from the structure and positioned upon any part of a motor vehicle upon which it is desired to center a beam of light, as for example a tire which needs repairing. To facilitate its holding when the desired position has been reached, I have devised the bracket shown particularly in Figures 2 and 3, though it is obvious that other forms of holding member could be substituted, with varying degrees of efficiency, for that herein shown. This bracket consists of a neck piece 45, which may be set in position about the stud 15 of the lamp by means of the screw 47. With the lower end of this neck piece is pivotally joined, as at 48, a spring encircling stud 49 from the rear or outer end of which rises a convolute spring wire structure 50 whose arms 51 and 52 bend inwardly toward one another, and indeed overlap. Each of these branches beyond the overlapping portion just mentioned is formed with terminal looped pieces 53 and 54 respectively, which may be armored with rubber tubing, as shown at 55. These extensions normally lie closely pressed against one another, but if the spring branches 51 and 52 be manually pressed toward one another, with the same movement as in pulling out the lamp portion 16, the looped pieces 53 and 54 will be resultantly pushed apart, outwardly from one another, and these rubber-armored pieces may be harmlessly slipped about an enameled or nickle-plated portion of the motor vehicle structure which is selected to serve as the temporary support for the light while the repair or trouble investigation work is in progress. The resilient outward or drawing-away movement of the branches 51 and 52 results in clamping the rubber-armored pieces 53 and 54 tightly about the motor vehicle part selected, and thus holding the lamp 16 firmly though detachably in place. If desired, additional convolutions of the resilient branches 51 and 52 may be provided, as at 56 and 57, for the engagement therethrough of a screw-threaded pin 58, upon which is mounted the milled nut 59, by whose selective positioning along the screw threaded pin 58 the degree of possible opening induced between the clamping loops 53 and 54 may be regulated.

What I claim is:

A combined storage reel and automatic switch for a flexible electrical conductor, having, in combination with an enclosing shell, a storage drum rotatably supported therewithin, and a flexible insulated conductor carried upon said drum, a screw-threaded projection carried by and projecting substantially axially from one end of said drum and having a spring-pressed conducting plunger projecting substantially axially from its extremity, a traveling actuating member threadedly carried on the projection from the drum, but non-rotatable therewith, being mechanically connected to but electrically insulated from the enclosing shell and axially movable with respect to the drum upon rotation of the latter, a contact member carried by the shell in substantial axial alignment with the drum and plunger, and engageable by the latter, another contact member also carried by the shell laterally of the first, and a lever member actuatable by the traveling actuating member to make and break an electrical circuit between the contact members.

In witness whereof I hereunto set my hand.

THOMAS J. COOLICK.